Feb. 11, 1930.   D. C. WISELEY   1,746,572
COMBINED BUMPER, TIRE PROTECTOR, AND LUGGAGE CARRIER
Filed July 31, 1929
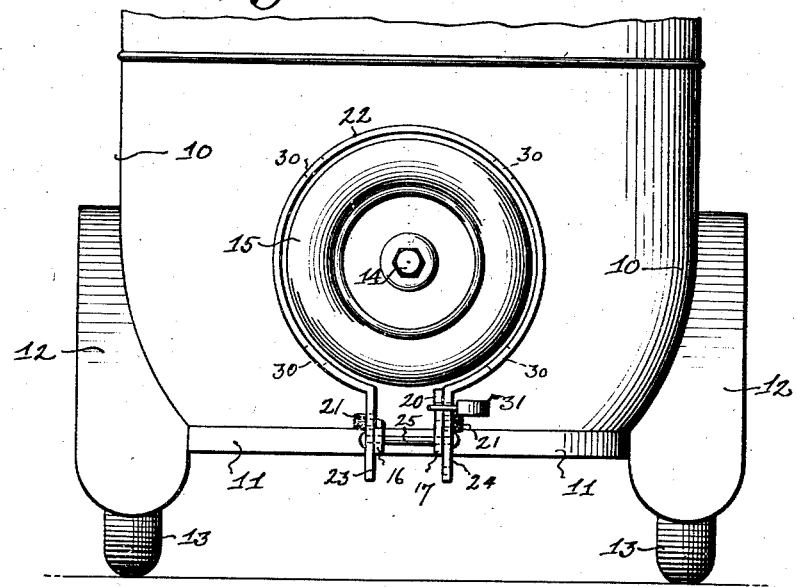
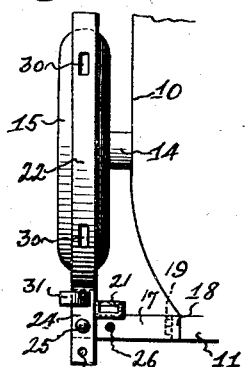
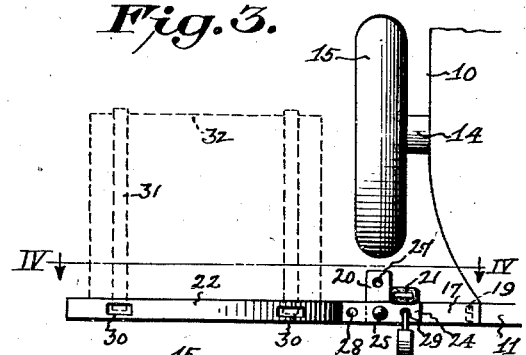
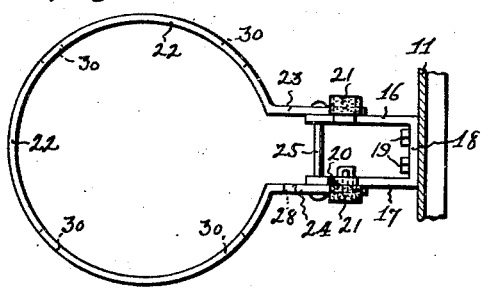
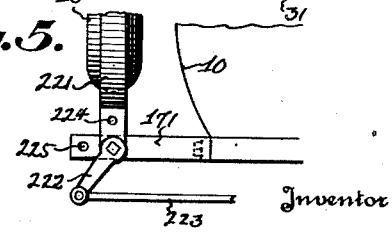
Inventor
Don Carlos Wiseley.

Patented Feb. 11, 1930

1,746,572

UNITED STATES PATENT OFFICE

DON CARLOS WISELEY, OF LOS ANGELES, CALIFORNIA

COMBINED BUMPER, TIRE PROTECTOR, AND LUGGAGE CARRIER

Application filed July 31, 1929. Serial No. 382,338.

This invention relates to a bumper or fender pivotally attached to the rear of an automobile body capable of being adjusted and secured in a vertical or horizontal position and enabling the same to be used not only as a rear fender but, also, as a protector or guard for a spare tire in its upright or vertical position, or a luggage carrier when disposed in an inclined or horizontal position.

The objects of the invention are:

First, to provide a combined bumper or rear fender, tire protector and luggage carrier, which is light and of minimum cost to manufacture and install on an automobile body without in any way changing the shape of the automobile body or its chassis, or requiring the use of skilled labor or special tools.

Second, to provide a bumper or fender of the character above indicated, which is capable of being readily adjusted and secured in its different positions to effect the various functions above pointed out with the use of a minimum number of parts and weight and manual labor.

Third, to provide a rear bumper or fender capable of performing at all times a useful function in each of its several adjusted positions whether the automobile is parked or under way.

Fourth, to provide a construction whereby the rear fender or bumper can be adjusted without the driver vacating the front seat of the car.

Fifth, other objects and advantages of the invention will appear and be manifest from the detailed description of the construction and arrangement of the parts and mode of operation to be hereinafter given.

The invention consists of structural characteristics and relative arrangement of elements which will be presently more fully disclosed and particularly pointed out in the appended claims.

In the drawings, in which similar reference characters indicate the same parts in the several figures:

Figure 1 is an elevation of the rear of an automobile with my invention attached thereto;

Figure 2 is a fragmentary side elevation of the rear of an automobile showing the vertical or upright position of the rear bumper;

Figure 3 is a similar view to Figure 2 showing the lower or horizontal position of the fender;

Figure 4 is a section and top plan view taken on line IV—IV of Figure 3; and,

Figure 5 is a fragmentary side elevational view of a modified form of the invention.

Referring to Figures 1, 2, 3 and 4, 10 is the rear section of the body of an automobile provided with the usual chassis 11, mud guards 12, 12, and rear wheels 13, 13, which needs no further disclosure.

Attached to the middle section of the rear of said body 10 is provided the usual support 14 for carrying a spare tire 15, and while I have shown this type of spare tire support any other means for carrying a spare tire at the rear of an automobile may be used in conjunction with the present invention without in any way modifying the construction of the cooperating parts, or manner of using the same.

A bracket is secured by any suitable means to the rear end of the chassis 11 or body 10 directly below the spare tire support 14, as shown, said bracket preferably consisting of a U-shaped member having horizontally projecting ends 16 and 17 and a connecting part 18 through which bolts 19, 19, pass to rigidly secure the same to the chassis 11, as indicated in Figure 4.

The end 17 has a short upright extension 20 at its extremity, see Figures 1 and 3, and near the outer portion of the top edge of each of said horizontally projecting ends 16 and 17 is secured a resilient cushioning pad 21, for purposes to be later explained.

22 is a resilient circular or hoop-shaped fender having parallel projecting ends 23 and 24 disposed and hinged or pivotally connected and supported by the extremities of the projecting ends 16 and 17 of the bracket by a rod 25 passing through suitable openings in said ends 16 and 17, as shown in Figures 1 and 4. Said fender or bumper 22 is preferably made circular to provide a yielding action and the same has no protruding ends which can engage or lock with a fender of another car. Said circular construction of the bumper also permits it to encircle the spare tire so as to give accessibility to the tire for its removal at all times and protect its tread surface from injury from impact with any other body.

The horizontal end 17 of the bracket is provided with a hole 26 and its upright extension 20 with a hole 27, as shown in Figures 2 and 3.

The projecting end 24 of the fender or bumper 22 is provided with holes 28 and 29, so spaced and arranged that hole 28 will register with hole 27 when the fender 22 is in an upright position, as indicated in Figure 2, and hole 29 will register with hole 26 when the fender 22 assumes its horizontal position, as shown in Figure 3.

31 is a lock or other similar means adapted to pass through said registering holes 26 and 29, or holes 27 and 28, for purposes of locking said fender 22 to its supporting bracket ends 16 and 17, after being adjusted in either its horizontal or upright position, as will be clearly understood and needs no further disclosure.

From the foregoing disclosure, it will also be seen that the rigid resilient cushion pads 21 are so disposed as to be engaged by the pivoted ends 23 and 24 when the fender 22 is in its horizontal or vertical locked position, thereby preventing any rattling or noise from vibration when the automobile is driven over the highway.

The fender or bumper 22 is preferably provided with holes 30 in its circular section, so arranged that when the same is locked in horizontal position and a tour is contemplated, a series of straps or other fastening means 31 can be laced through said holes 30 and over any luggage or suit cases 32 resting on top of said bumper, as indicated in dotted lines in Figure 3, thereby firmly securing the same in place.

In Figure 5 is shown a modified form in which the fender or bumper 221 is pivotally connected to a bracket extension 171, similar to that disclosed with reference to Figures 1 to 4, inclusive, except that the pivoted end of the fender or bumper 221 is provided with a crank arm 222 having a rod 223 which extends and may be grasped and operated by the driver of the car and enables him to lower or elevate said fender from the forepart or seat of the automobile. Registering holes 224 and 225 are, also, provided for locking the fender or bumper 221 in either its horizontal or vertical position.

From the foregoing disclosure of the construction and relation of the several parts, it will be seen that all the objects and advantages recited in the statement of invention have been fully and efficiently carried out, and a resilient rear bumper or fender has been provided which can be rigidly supported in its operative or inoperative position, and in the operative or horizontal position will keep other cars parked parallel to the curb at a greater and proper distance from a car equipped with the present invention than would be possible with the usual and prior forms of rear bumpers.

The novel construction and arrangement of applicant's bumper allow it to be raised or withdrawn from its extended or horizontal position, and in its vertical position occupies a minimum space and further protects the spare tire and insures free and easy access to the same for its inspection, inflation and removal without disturbing any of the parts of the bumper.

The simple locking means, incorporated in the construction of the bumper, for securing the bumper in either its vertical horizontal position can be easily manipulated, and when said bumper is locked in its operative or horizontal position it will prevent others from raising the bumper to take advantage of the additional parking space provided by the improved bumper of the present invention, and accidental dropping of said bumper from its locked vertical position due to jars, or the like, is avoided when the automobile is being driven over rough places.

While I have shown two and the preferred forms of my invention, it will be understood that many other forms, changes, or variations of said bumper will readily suggest themselves without in any way departing from the present invention or evading the scope of the claims.

What I claim is:

1. In combination with an automobile body provided with a rear support for a spare tire, an extension at the rear of said body and below said support, a bumper movably mounted on said extension and adapted to surround said rear support in its upright or vertical position and rearwardly project from said support and end of the body in its horizontal position.

2. In combination with an automobile body provided with a rear support for a spare tire, an extension at the rear of said body and below said support, a circular bumper pivotally mounted on said extension and adapted to encircle said rear support with the spare tire in its upright or vertical position and rearwardly project from said support and end of the body in its horizontal position.

3. In combination with an automobile body provided with a rear support for a spare tire, an extension at the rear of said body and below said support, a circular bumper pivotally mounted on said extension and adapted to encircle said rear support in its upright or vertical position and rearwardly project from said support and end of the body in its horizontal position, and means for engaging said bumper in either its upright or horizontal position to said extension.

4. In combination with an automobile body provided with a rear support for a spare tire, an extension at the rear of said body and below said support, a circular bumper pivotally mounted on said extension and adapted to encircle said rear support in its upright or vertical position and rearwardly project from said support and end of the body in its horizontal position, and means for locking said bumper in either its upright or horizontal position.

5. In combination with an automobile body provided with a rear support for a spare tire, an extension at the rear of said body and below said support, a curved bumper pivotally mounted on said extension and adapted to encircle said rear support in its upright or vertical position and rearwardly project from said support and end of the body in its horizontal position, said bumper provided with openings to receive means to secure and retain luggage on said bumper when adjusted in its horizontal position.

6. In combination with an automobile body provided with a rear support for a spare tire, an extension at the rear of said body and below said support, a bumper pivotally mounted on said extension and adapted to protect said rear support with the spare tire in its upright or vertical position and rearwardly project from said support and end of the body in its horizontal position, and means attached to said bumper for operating the same on its pivotal connection at a point removed from the rear support and end of said automobile body.

In testimony whereof, I hereunto affix my signature.

DON CARLOS WISELEY.